United States Patent
Grote et al.

(10) Patent No.: US 6,810,182 B2
(45) Date of Patent: Oct. 26, 2004

(54) OPTICAL TUNABLE GRID-ASSISTED ADD/DROP FILTER IN CODIRECTIONAL MODE OF OPERATION

(75) Inventors: Norbert Grote, Berlin (DE); Georges Przyrembel, Berlin (DE); Huithai Yao, Berlin (DE)

(73) Assignee: Heinrich Hertz Institut fuer Nachrichtentechnik Berlin GmbH., Berlin (DE)

( * ) Notice: Subject to any disclaimer, the term of this patent is extended or adjusted under 35 U.S.C. 154(b) by 98 days.

(21) Appl. No.: 10/276,944
(22) PCT Filed: May 18, 2001
(86) PCT No.: PCT/DE01/01993
§ 371 (c)(1), (2), (4) Date: Nov. 18, 2002
(87) PCT Pub. No.: WO01/88608
PCT Pub. Date: Nov. 22, 2001

(65) Prior Publication Data
US 2003/0133490 A1 Jul. 17, 2003

(30) Foreign Application Priority Data
May 18, 2000 (DE) .......... 100 25 307

(51) Int. Cl.⁷ .......... G02B 6/42
(52) U.S. Cl. .......... 385/42; 385/15; 385/24
(58) Field of Search .......... 385/15, 24, 28, 385/30, 42, 43, 48, 50

(56) References Cited

U.S. PATENT DOCUMENTS 5,978,530 A * 11/1999 Russell et al. .......... 385/528 X

* cited by examiner

Primary Examiner—Phan T. H. Palmer
(74) Attorney, Agent, or Firm—Karl Hormann

(57) ABSTRACT

A tunealble optical grid-assisted add/drop filter for codirectional operational mode consisting of at least two waveguides composed of two different classes of material of different optical parameters. The thermal refractive index coefficient dn/dT, the electro-optic coefficient dn/dE or the dispersion dn/dλ of the two materials differ from each other such that when the temperature, the electric field or the wavelength of or in the two waveguides is change, the result will be effects of different powers.

10 Claims, 3 Drawing Sheets

OPTICAL TUNABLE GRID-ASSISTED ADD/DROP FILTER IN CODIRECTIONAL MODE OF OPERATION

BACKGROUND OF THE INVENTION

1. Field of the Invention

The invention relates to an optical tunealbe grid-assisted add/drop filter in codirectional mode of operation structured as a directional coupler filter with at least two waveguide extending closely adjacent of different refractive indices, one of the waveguides being provided with a grid.

2. The Prior Art

In optical telecommunications technology add/drop filters are key components in so-called WDM (wavelength division multiplexing) systems in which several wavelengths are propagated in one fiber strand. Such add/drop filters adding and dropping one or more wavelengths into or from the fiber. It is known to structure add/drop filters as directional coupler filters. In a filter of this kind there are arranged at least two waveguides extending closely adjacent each other and of different refractive indices, at least one of the waveguides being provided with a grid. Preferably, the grid is disposed on the waveguide of the higher refractive index. Such an add/drop filter has been described, for instance, in IEEE Phot. Technol. Lett., Vol. 4, No. 12, December 1992, pp. 1386–1389.

Purely fiber-optical realizations of add/drop filters in which silica is used for the fibers, have been described in IEEE Phot. Technol. Lett., Vol. 8, No. 12, December 1996, pp. 1656–1658 and in U.S. Pat. No. 5,978,530, the latter publication referring to the possibility of realization in planar optical geometry. However, these fiber-optical filters are not structured for tuning.

The prior art is familiar with tuneable filters structured as common Mach-Zehnder interferometers with a poorly selective $\sin^2$-filter curve. Such filters may be tuned, for instance, by separate thermo-optically effective heating electrodes mounted on the waveguide or guides.

In InP-technology comparable filters are known which may be detuned thermo-optically or electro-optically. For instance, a thermo-optically detunable filter has been described in Proc. of the $10^{th}$ Int. Conf. on InP and Rel. Mat., (IPRM '98), Tsukuba, Japan, (1998) pp.7—Post-deadline paper. The filter disclosed is made of materials of a class (III–V-compounds), i.e. GaInAsP/InP, as an asymmetric lateral grid-assisted codirectional direction coupler filter of two waveguides, one of which is weakly propagating and one of which is strongly propagating, with the grid being disposed on the strongly propagating wave gate and resulting in a wavelength selective behavior of the component. However, high manufacturing tolerances are required for fabricating small dimensions of the mentioned filters in InP technology; also, there is a higher attenuation as a consequence of the mode mismatching relative to glass fibers.

The prior art (see Electr. Lett. Vol. 36, No. 5, pp. 430–431, 2000) also discloses an arrangement in which a thermo-optical coupler switch is provided with two parallel $SiO_2$ waveguides on which is disposed a polymeric waveguide such that it intersects the $SiO_2$ waveguides disposed beneath it. At each intersection with a $SiO_2$ waveguide the polymeric waveguide is provided with a heating electrode. In this case, the planar $SiO_2$ waveguide is utilized as a transmissive layer and the polymeric waveguide is utilized for the switching function.

OBJECTS OF THE INVENTION

It is the object of the invention to provide a high-resolution tuneable add/drop filter of a spectral band width of the filter transmissive curve in the range in excess of 50 GHz, which can be fabricated in a simpler and more cost-efficient manner with higher dimensional tolerances compared to add/drop filters based on III–V materials.

It is to be noted that band width ranges between 50 GHz and 400 GHz are of particular interest to current and future applications in the field of communications technology.

SUMMARY OF THE INVENTION

The object is accomplished in an add/drop filter of the kind referred to above by the material of the two waveguides consisting of two different material classes of different optical parameters with the coefficient of the thermal refractive index $dn/dT$ and/or the electro-optical coefficient $dn/dE$ and/or the dispersion $dn/d\lambda$ of the two materials differing such that by acting on the two waveguides with the same technical means for changing the temperature and/or the electric field and/or the wavelength effects of different strengths result, and by means being provided for changing these optical parameters.

In the known arrangement of an add/drop filter based on a directional coupler structure in which two parallel waveguides are separated by a gap over a certain length, the two waveguides are differently dimensioned (e.g. width, height, refractive index) as a result of manufacturing tolerances and deliberate settings. This results in different propagation constants within the waveguides, i.e. the component is asymmetric. At such asymmetry a complete exchange of energy between the two waveguides is no longer possible. Symmetry may again be established by applying a grid to one of the waveguides. The high frequency selectivity connected therewith is utilized for the filtering function. The waveguides of an add/drop filter which in accordance with the invention are made of materials from two different classes in which—as has been mentioned—the optical parameters differ from each other, make possible deliberate tuning of the filter by simple technical means.

An embodiment of the add/drop filter in accordance with the invention provides for one waveguide being made of silica and the other waveguide being made of a polymeric material, more particularly a polymeric material of non-linear optical properties.

In another embodiment of the invention the waveguide with the larger refractive index is provided with a grid.

In further embodiments the two waveguides are arranged vertically or horizontally with respect to each other. The realization of the two waveguides in laminar planar micro technology in particularly results in a simple and cost-efficient fabrication of the entire filter.

Since in accordance with the invention the coefficient of the thermal refractive index $dn/dT$ of the two waveguides made of materials from two different classes differs such that at an identical change of temperature the reaction of the two waveguides in respect of their refractive indices differs, the means for changing the coefficient of the thermal refractive index $dn/dT$ is a device for changing the temperature which acts on the entire surface of the chip, particularly from below. More particularly, the device may be identical to a device of the kind, e.g. a Peltier element, commonly used for stabilizing the temperature of known add/drop filters. This embodiment requires no additional step for fabricating specific heating electrodes and appurtenant controls, and at a homogeneous change in temperature in the entire component it makes possible different changes in the refractive indices of the two waveguides. This results in an effective thermal tuning of the component without an application of local heating electrodes. In this manner, the invention—compared to the arrangements of the prior art—makes possible temperature stabilization and temperature trimming for balancing manufacturing tolerances as well as the desired wavelength tuning of the filter.

Of course, in a different embodiment of the invention the means for changing the coefficient of the thermal refractive index dn/dT may be a heating electrode disposed on the waveguide the coefficient of which displays a greater temperature dependency.

The means for changing the optical parameter dn/dE are electrodes for generating an electric field E with at least one electrode being disposed on the waveguide having the greater index of refraction. If an electric field is applied to this waveguide, it is known that in accordance with the Pockel effect the refractive index of the polymer (Δn~E) will change. The specific arrangement of the electrodes for generating an electric field which affects the refractive index of the underlying waveguide will be decided by the person skilled in the art in dependence of the desired direction of the electric field and the active electro-optic coefficient for affecting the mode coupling in a predetermined manner. For instance, a vertical electric field $E_I$ is generated by an electrode arranged directly on the NLO polymer waveguide to make use of the greatest electro-optic coefficient for polymeric waveguides having non-linear optic properties. In the present case, the electro-optic coefficient $r_{33}$ for TM polarization is utilized. A horizontal electric field $E_I$ is generated by electrodes disposed at both sides of the polymer waveguide. In this case, use is made of the electro-optic coefficient $r_{13}$. In general $R_{13} \approx \frac{1}{3} r_{33}$.

Polymers which have a great electro-optic coefficient dn/dE tuning may be achieved in the ps range. It may thus be realized more quickly than by a change of temperature and the action by the thermo-optic effect in comparable arrangements. This is true, in particular, in connection with the non-linear optic polymer materials mentioned above.

It is to be noted that the selected difference between the refractive indices of the two waveguides be sufficiently large to allow the application of a grid known from the prior art. The basic equation for the grid period Λ of the used grid which is characterized by a periodic change of the refractive index is: $\Lambda = \lambda_c/(n_1 - N_2)$, wherein $\lambda_c$ is the filtered wavelength and $n_1$ and $n_2$ respectively are the refractive indices of the strongly and weakly propagating waveguides. As may be seen from the equation, the grid period assumes values if the difference in refractive indices is too small. Thus, the filter would have to be built very long (e.g. 100 mm). This would be disadvantageous. By increasing the stroke of the grid (grid amplitude) the length of the grid may be shortened provided the radiant emissions remain negligible.

A change of the dispersion dn/dλ may be achieved during fabrication of the filter in accordance with the invention by selecting other materials for making the waveguides.

Tuning of the add/drop filter in accordance with the invention may be carried out by changing individual optical parameters or by a combination thereof.

When fabricating the arrangement in accordance with the invention using a polymer as waveguide material having, for instance, a refractive index $n_1 = 1.49$, the geometric dimensions are larger by a factor of 3 than an InP (III–V) structure of refractive index of about 3.3. This would render the fabrication technology simpler and more cost-efficient, in view of the fact that higher dimensional tolerances can be permitted. Matching with optical glass fibers which establish the connection to the four ports (Inputs/outputs) may, without tapering, be of significantly lower attenuation (per unit length) than would be the case with InP-based add/drop filters. For tuning the filters made, in accordance with the invention, from polymer/silica, a wavelength shift above the temperature of about 3 nm/K is expected. Publications relating to comparable filters in InP report a lower sensitivity of 0.37 nm/K.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DESCRIPTION OF THE PREFERRED EMBODIMENT

As is known, an add/drop filter is provided with four gates (Inputs/outputs) connected to each other by two waveguides. One of the waveguides which extend parallel to each other over a defined length (coupling length) is made of PMMA (polymethylmethacrylate) having a refractive index of $n_1 = 1.49$; the other waveguide is made of doped $SiO_2$ (silicondioxide) having a refractive index of $N_2 = 1.454$. The two waveguides are separated by silicon measuring 4 μm in thickness and are disposed vertically of each other. The waveguide made of polymer is 2 μm thick; the thickness of the one made of doped $SiO_2$ is 4 μm. The waveguide of the greater refractive index is provided with a grid since, as is well known, its effect is more efficient there and the structural length may thus be shorter. The grid amplitude is 0.2 μm, the grid period is 64 μm, and the overall length of the waveguide is 10,600 μm. For a specific optical wavelength the grid affects an energy transfer to be determined for each grid period. Thus, after a certain number of grid periods the light signal will completely transfer from one waveguide to the other. A change in temperature affects the molecular chains of the polymer which results in a change of the local refractive index and, therefore, of the filter characteristic.

Figure 1:
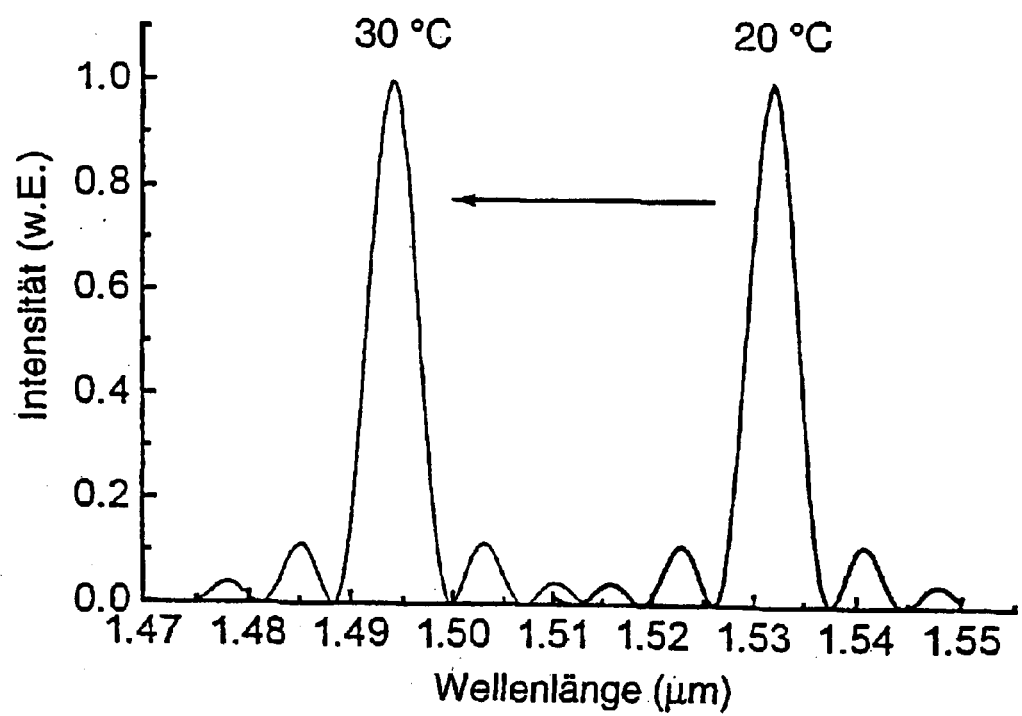
FIG. 1 depicts the shift in the filter curve at a temperature increase of 10 K uniformly acting on the chip provided with the add/drop filter in accordance with the invention.

FIG. 1 depicts the shift of the filter curve at a homogeneous increase in temperature by 10 K of the chips provided with the add/drop filter in accordance with the invention. The tuning behavior as a function of the temperature was calculated. At an increase in temperature of 10 K (from 20° C. to 30° C.) the refractive index of the polymer waveguide changes from 1.49 to 1.489. The shift of the frequency towards lower wavelengths at a temperature increase may be clearly seen. The filter curves shown display a sinc characteristic. By apodosaging the grid a Gaussian filter curve may be attained. In that case the grid amplitude, commencing at 0, will increase to a maximum over the length of the waveguide structure and will thereafter decay again down to 0. Owing to the low grid effectiveness the overall length of the waveguide structure increases by a factor of 3.

Figure 2:
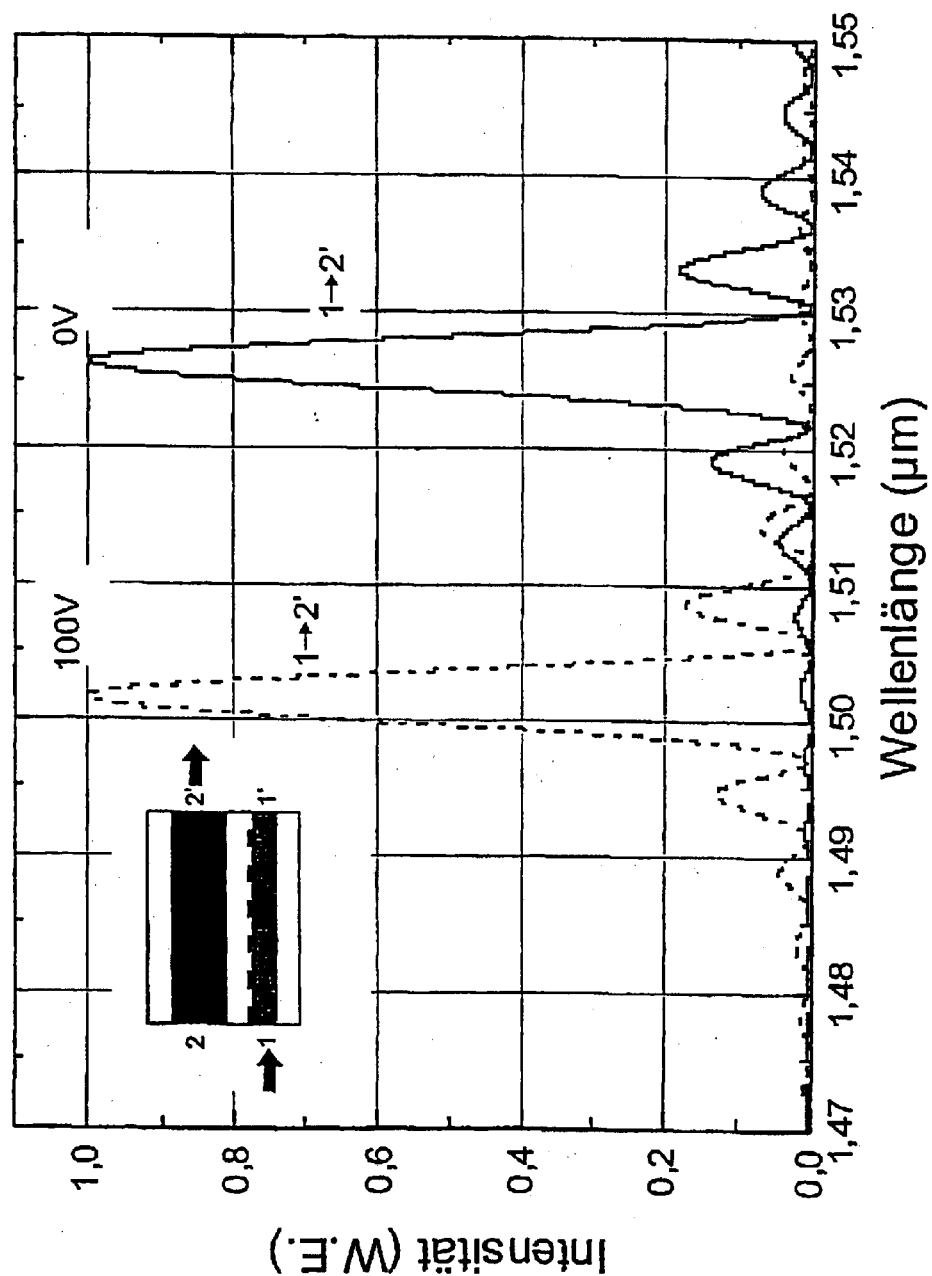
FIG. 2 depicts the shift of the filter curve upon application of an electric field to the add/drop filter in accordance with the invention.

It is known that polymeric materials of non-linear optical properties also show a large electro-optical coefficient (dn/dE). This property, too, is utilized in the arrangement in accordance with the invention for tuning the add/drop filter. A change in the refractive index $\Delta n_1$ of the waveguide made of polymeric material is caused by generating, for the TM mode, a vertical electric field $E_I$ by an electrode arranged on the polymeric waveguide and is defined by $$\Delta n_1 = -\tfrac{1}{2} n^3 R_{33} E,$$

wherein $n_1$ is the refractive index of the polymer material and $r_{33}$ is the electro-optical coefficient. The values of $r_{33}$ for electro-optical polymers range from about 10 pm/V to about 50 pm/V. An actual calculation of the refractive index of the polymer material based on the following values $n_1=1.49$; $r_{33}=20$ pm/V and thickness of the polymer layer d=5 µm, resulted in accordance with the above equation, upon applying a voltage of 100 V to the polymeric layer, in a change of the refractive index of the polymer layer of $\Delta n_1=-6.62\cdot 10^{-4}$, Accordingly, the refractive index changed from 1.49 to 1.48934. In FIG. 2, the shift of the filter curve is shown as a function of the applied voltage. Applying a voltage of 100 V results in a shift of the wavelength maximum at a constant intensity, from 1.5262 µm to 1.5016, i.e. $\Delta\lambda\sim 24.6$, provided gate 1 functions as the Input and gate 2' functions as the output, as shown in the inset image. As has already been mentioned, the great tuning speed, relative to the thermo-optic effect, which in principle lies in the ps to sub-ps range and which depends upon the material used as well as the external circuit arrangement, is of advantage.

Figure 3:
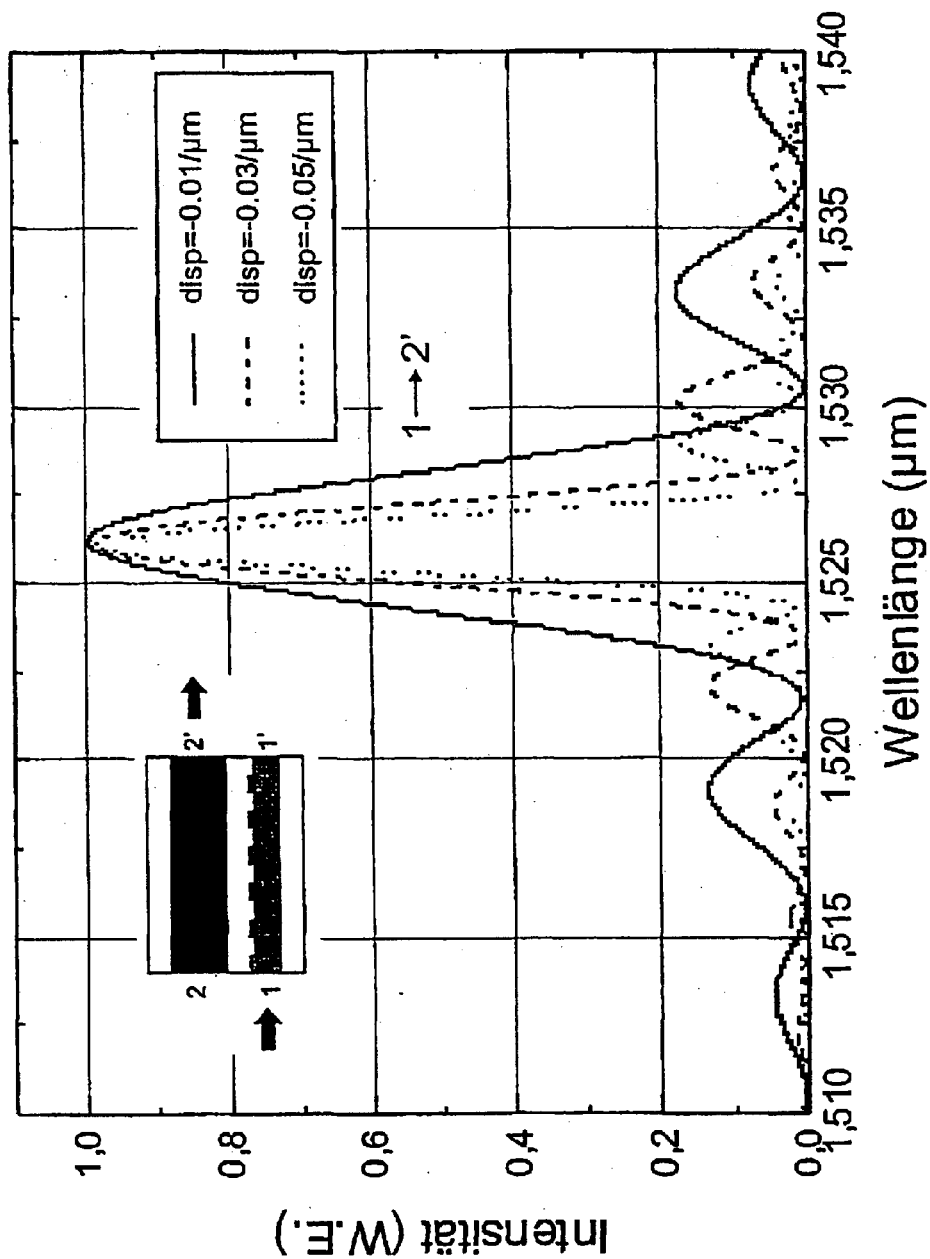
FIG. 3 depicts the effect of the material dispersion on the filter power.

Non-linear optical polymers not only display a large electro-optic coefficient dn/dE but also a large dispersion dn/dλ which near the absorption length assumes a particularly large value. In the 1.3 µm and 1.55 µm range the dispersion values of the non-linear optical polymers change from $-0.02/\mu m$ to $-0.05/\mu m$. The result of a calculation, shown in FIG. 3, for three different dispersion values demonstrates that the bandwidth of the optical filter depends upon the dispersion. Again, gate 1 functions as the input and gate 2' functions as the output as depicted in the inset image. The 3 dB-bandwidth for the hybrid add/drop filter in accordance with the invention is, at a dispersion value of $-0.012/\mu m$ for $SiO_2$ and $-0.01/\mu m$ for linear or passive polymers, equal to 4.1 nm. This bandwidth changes to 2.5 nm for a nonlinear optical polymer with a dispersion of $-0.03/\mu m$. If the dispersion is increased to $-0.05/\mu m$, the 3 db bandwidth is narrowed further to 1.7 nm.

What is claimed is:

1. An optical tuneable grid-assisted add/drop filter of codirectional operating mode structured as a directional coupler filter with at least two waveguides of different refractive indices and extending closely adjacent each other, one of the waveguides being provided with a grid, characterized by the fact that the material of the two waveguides is formed from materials of two different classes of different optical parameters, the coefficient of the thermal refractive index dn/dT and/or the electro-optic coefficient dn/dE and/or the dispersion dn/dλ of the two materials differing such that action on the two wave guides of identical technical means for changing the temperature and/or the electric field and/or the wavelength results in different effects and that means are provided for changing these optical parameters.

2. The add/drop filter of claim 1, characterized by the fact that one waveguide is made of a polymeric material and the other waveguide is made of silica.

3. The add/drop filter of claim 2, characterized by the fact that the polymeric material posses non-linear properties.

4. The add/drop filter of claim 1, characterized by the fact that the means for changing the optical parameter dn/dT is a device for changing the temperature and acting upon the entire surface of a chip provided with the filter.

5. The add/drop filter of claim 4, characterized by the fact that the device for changing the temperature of the entire surface is identical to a device for stabilizing the temperature of the chip provided with the filter.

6. The add/drop filter of claim 1, characterized by the fact that the two waveguides are disposed horizontally with respect to each other.

7. The add/drop filter of claim 1, characterized by the fact that that the waveguide with the greater refractive index coefficient is provided with a grid.

8. The add/drop filter of claim 1, characterized by the fact that the two waveguides are disposed vertically with respect to each other.

9. The add/drop filter of claim 1, characterized by the fact that the means for changing the optical parameter dn/dT is a heating electrode disposed on the waveguide the coefficient of which has a greater temperature dependency.

10. The add/drop filter of claim 1, characterized by the fact that the means for changing the optical parameter dn/dE is at least one electrode for generating an electric field in the waveguide upon which the electrode is arranged.

* * * * *